(12) United States Patent  (10) Patent No.: US 6,603,089 B1
White et al.  (45) Date of Patent: Aug. 5, 2003

(54) QUICK RELEASE CHUCK FOR ELECTRODES

(76) Inventors: Richard A. White, 7530 Leeward Ave. North, Stillwater, MN (US) 55082; Thomas A. Hoffer, 13380 Lynch Rd. North, Hugo, MN (US) 55038

( * ) Notice: Subject to any disclaimer, the term of this patent is extended or adjusted under 35 U.S.C. 154(b) by 80 days.

(21) Appl. No.: 09/854,730

(22) Filed: May 14, 2001

Related U.S. Application Data

(60) Provisional application No. 60/204,280, filed on May 15, 2000.

(51) Int. Cl.$^7$ .............................. B23H 1/04; B23B 31/02
(52) U.S. Cl. ................................. 219/69.15; 279/133
(58) Field of Search ................. 219/69.15; 269/309; 279/6, 8, 133, 142

(56) References Cited

U.S. PATENT DOCUMENTS

| | | | | |
|---|---|---|---|---|
| 4,349,716 A | * | 9/1982 | Di Piazza | 219/69.15 |
| 4,771,521 A | * | 9/1988 | Smith et al. | 29/27 R |
| 4,855,558 A | * | 8/1989 | Ramsbro | 219/69.15 |
| 4,870,242 A | * | 9/1989 | Sebzda, Sr. | 219/69.15 |
| 4,881,727 A | * | 11/1989 | Nemirovsky | 269/309 |
| 5,167,405 A | * | 12/1992 | Cayley, Jr. | 269/309 |
| 5,219,376 A | * | 6/1993 | Vinohradsky | 29/825 |
| 5,791,803 A | * | 8/1998 | Nordquist | 403/13 |
| 6,268,580 B1 | * | 7/2001 | Boyer, Jr. | 219/69.15 |

OTHER PUBLICATIONS

Drawing of electrode chuck used internally by Applicant to hold graphite electrodes more than one year prior to the earliest effective filing date of the present application.

* cited by examiner

*Primary Examiner*—M. Alexandra Elve
*Assistant Examiner*—Kevin P. Kerns
(74) *Attorney, Agent, or Firm*—Nikolai & Mersereau, P.A.; Thomas J. Nikolai

(57) ABSTRACT

A chuck used to attach an electrode to a CNC machine or an EDM machine having a quick release mechanism.

19 Claims, 11 Drawing Sheets

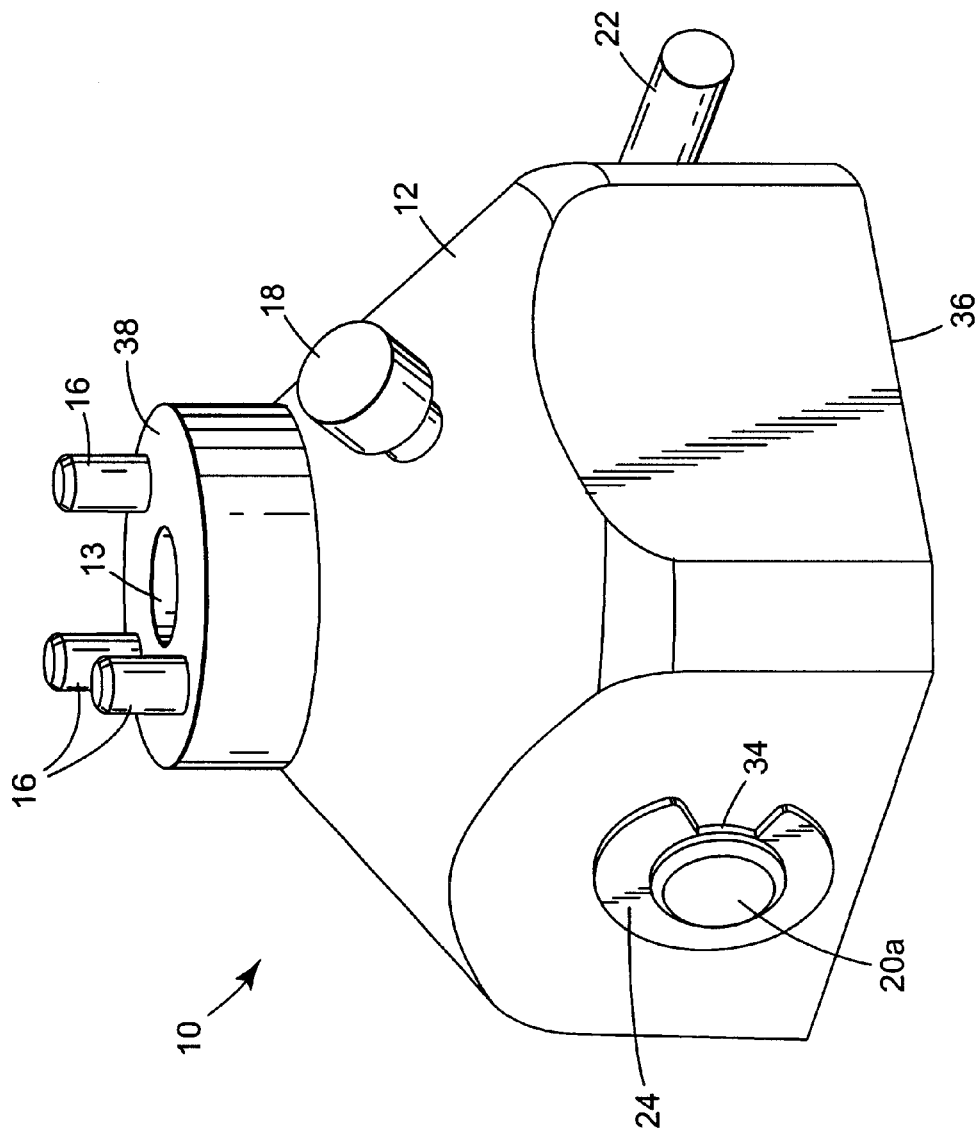

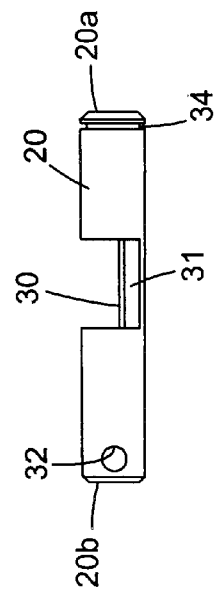
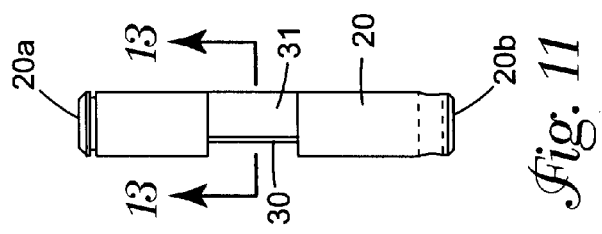
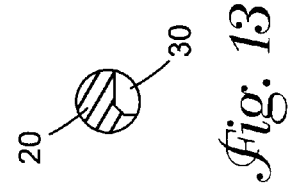

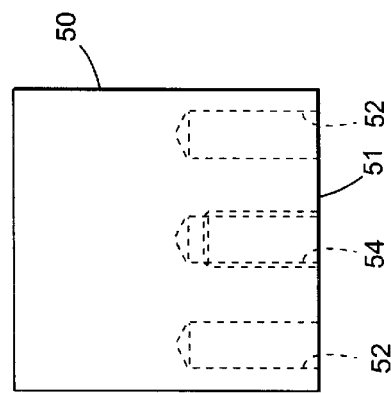
Fig. 16
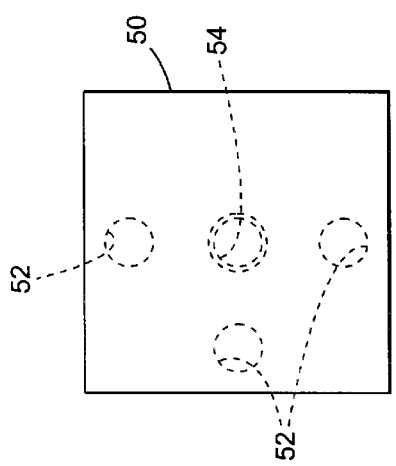
Fig. 14
Fig. 15

QUICK RELEASE CHUCK FOR ELECTRODES

This application claims the benefit of provisional application Ser. No. 60/204,280, filed May 15, 2000.

FIELD OF THE INVENTION

The Present Invention relates to a chuck for holding a graphite electrode during electrode machining and during electrical discharge machining procedures using the previously machined electrode.

BACKGROUND

Injection molding processes require the production of molds or tooling, which generally comprise two halves. Molds are made of blocks of solid metal, usually high-grade tool steel; however, mold making is a highly sophisticated process and often involves the incorporation into a mold of several different metal alloys. Each of the two mold halves define separate negative depressions that will eventually face each other during the injection molding process. When the two mold halves are clamped together, a cavity is formed which, when filled with pressurized molten plastic or metal from an injection molding press, forms a finished part having the outer dimensions of the cavity defined by the two mold halves.

Building the injection mold or tooling thus requires the creation of depressions in blocks of solid metal. For the finished part to meet quality standards, the depressions must be precisely placed on the mold halves, both as to the three dimensional outer contours of the depression as well as the two dimensional location of the corresponding depressions on the facing surfaces of the corresponding mold halves. Various techniques are used to create mold depressions, both separately and in combination, including traditional machining, CNC machining, EDM techniques and manual techniques. EDM encompasses two-separate techniques, wire EDM and plunge EDM. Plunge or sinker EDM requires mounting to an EDM machine an electrode machined into the shape of half of the desired finished part. The metal block that will be machined into a mold half is placed in the EDM machine and submerged in a dielectric fluid. A servo system advances the electrode into the dielectric fluid toward the metal block. At a point when the electrode is in close proximity with the metal block (i.e., .0.002 inch), an electric field punctures the dielectric fluid and electrical pulses begin to flow. The electrode contacts the metal block and creates sparks with short, intense, pulses of electric energy. Each spark leaves a tiny crater, resulting in the EDM cutting action. The position of the electrode is gradually deepened as metal is removed from the block, eventually resulting in a depression having the exact contours of the machined electrode.

In order for an EDM machine to be able to machine a metal block with sufficient precision, it is necessary for the electrode to be firmly mounted to the EDM machine. Present systems for mounting graphite electrodes to EDM machines include one manufactured by 3R corporation of Stockholm, Sweden. The 3R system involves an electrode mounted to a "coin" by either gluing or screws extending from the coin into the electrode. When the electrode is mounted to the coin, the coin is mounted to a chuck by means of tightening surrounding jaws via set screws. Finally, the chuck is mounted to an EDM or CNC machine. Erowa of Reinach, Switzerland manufactures another system, which features a graphite block mounted to a coin by four screws. The mounted coin is finally mounted to a chuck on an EDM or CNC machine, which requires hand tightening the chuck jaws. Finally, Hirschmann GmbH, Fluorn-Winzeln, Germany, manufactures a coin system for mounting electrodes involving two pins to aid in alignment. All of the above described systems involve relatively lengthy and expensive processes requiring either pre-mounted coins or gluing or screwing the electrode onto coins, followed by hand-tightening the coins to a chuck and sometimes separately mounting a chuck to an EDM or CNC machine. What is clearly needed is a faster and less expensive way to attach to and remove an electrode from an EDM or CNC machine that eliminates the need for a coin system.

SUMMARY OF THE INVENTION

A first aspect the invention is a chuck used to mount an electrode to an EDM or CNC machine. A first embodiment of the chuck includes (i) a body with a longitudinal bore, (ii) a draw bar configured and arranged for longitudinal slidable engagement within the bore as between a machining position and a release position, and (iii) a release mechanism in physical communication with the bore whereby activation of the release mechanism is effective for moving the draw bar from the machining position to the release position.

A second embodiment of the chuck includes (i) a body having a mounting surface and a bore longitudinally extending into the body from the mounting surface, (ii) a draw bar configured and arranged for slidable engagement within the bore, and (iii) a release mechanism coupled to the body and in communication with the bore for movement between a first position and a second position wherein the release mechanism is effective for longitudinally lifting the draw bar from a machining position to a release position when the release mechanism is moved from the first position to the second position.

A second aspect of the invention is a combination of a chuck selected from the chucks disclosed above with a graphite workpiece releasably mounted to a first longitudinal end of the draw bar.

BRIEF DESCRIPTION OF THE DRAWINGS

FIG. 2 shows a top perspective view of the invention without the draw bar placed within the first bore.

FIG. 11 shows a side view of the cam.

FIG. 12 shows a side view of the cam showing the lever aperture prior to insertion of the cam lever.

FIG. 13 shows a cross-sectional view of the cam taken along the lines 13—13 as shown in FIG. 11.

FIG. 14 shows a top view of the electrode.

FIG. 15 shows a side view of the electrode.

FIG. 16 shows a side view of the electrode.

DETAILED DESCRIPTION OF THE INVENTION INCLUDING A BEST MODE

Definitions

"CNC" refers to computerized numeral control machining.

"Coin" refers to a generally flat, metallic intermediate mounting device used to attach a graphite or other electrode to a chuck, to eventually be mounted to an EDM or CNC machine.

"EDM" refers to electrical discharge machining.

"Machining Position" refers to the position wherein the draw bar is fully extended into the chuck. In this position, graphite is mounted to the draw bar prior to machining by CNC machining to create the outer contours of the eventual finished part, or to a plunge EDM machine during the mold making process.

"Pallet" refers to a generally flat, separate, intermediate member that is attached on one side to the chuck mounting surface and on the other side to either an EDM or CNC machine. The chuck mounting side has apertures corresponding with the mounting apertures of the chuck, while the other side has apertures corresponding with the particular EDM or CNC machine.

"Release Position" refers to the position wherein the draw bar is not fully extended into the chuck. In the release position, the draw bar and mounted graphite can be quickly and easily removed from the chuck without the use of any other tools.

Nomenclature

Figure 1:
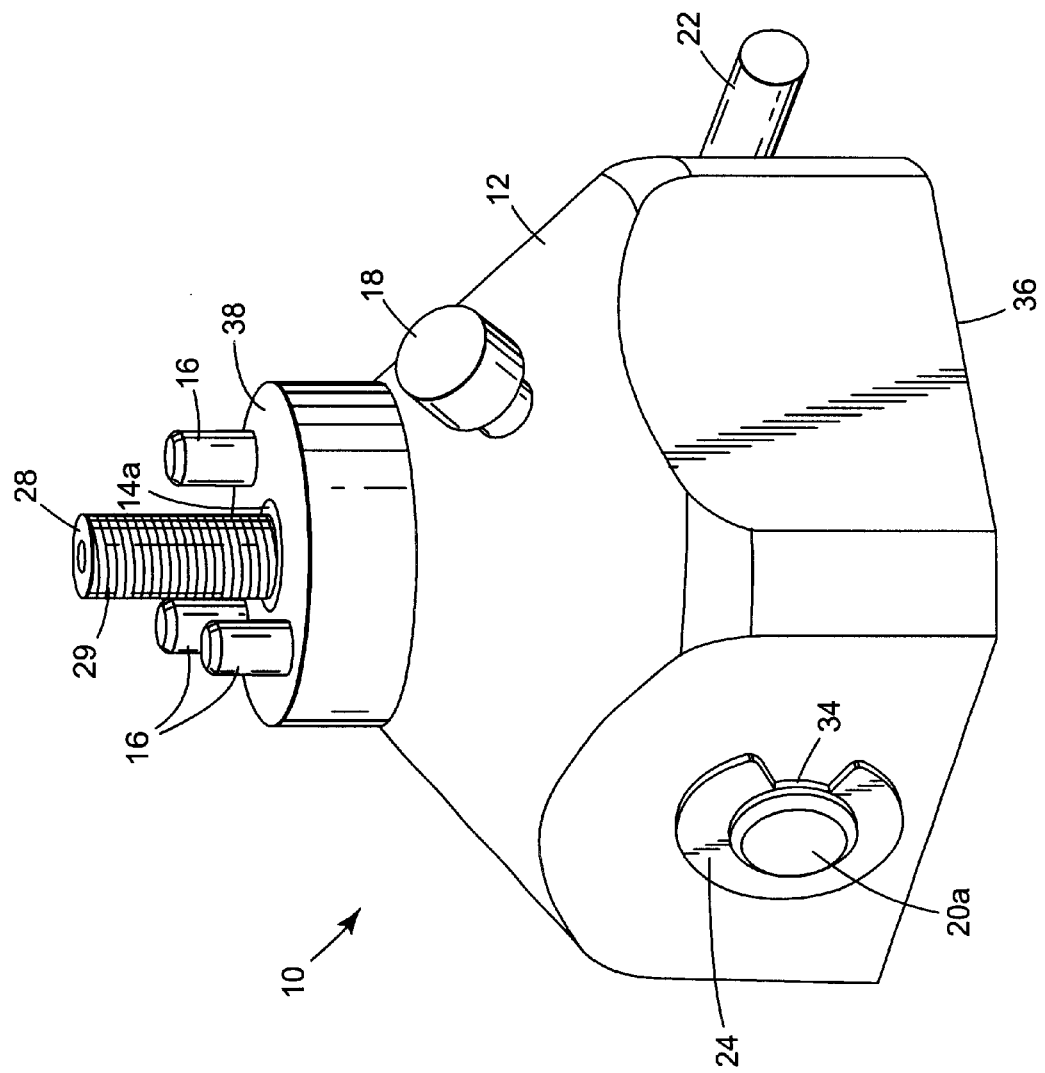
FIG. 1 shows a top perspective view of the invention, with the draw bar in the machining position.
Figure 4:
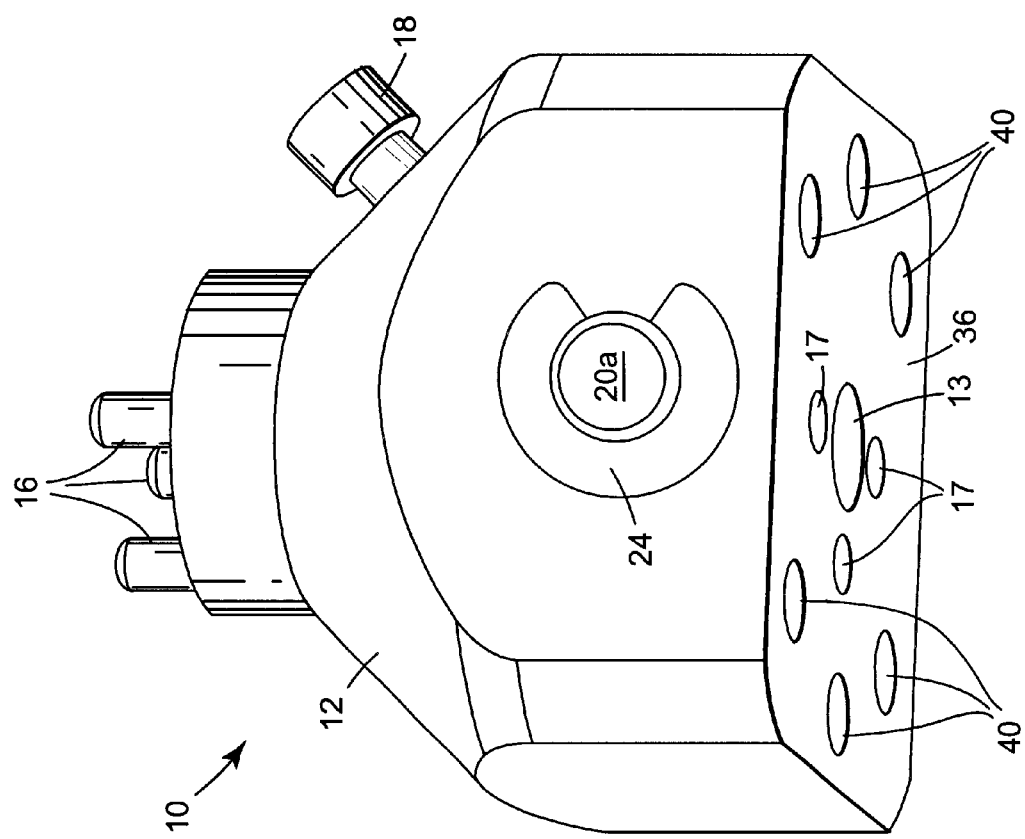
FIG. 4 shows a bottom perspective view of the invention without the draw bar placed within the first bore.
Figure 8:
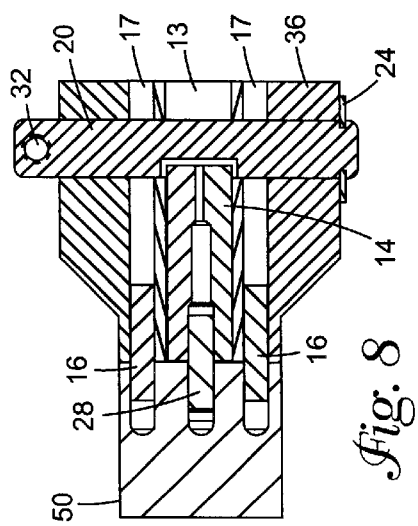
FIG. 8 shows a cross-sectional view of the invention taken along the lines 8—8 as shown in FIG. 6.
Figure 6:
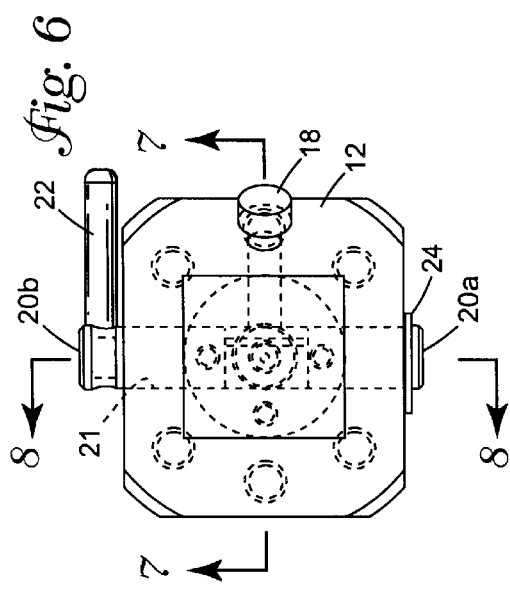
FIG. 6 shows a top plan view of the invention.
Figure 7:
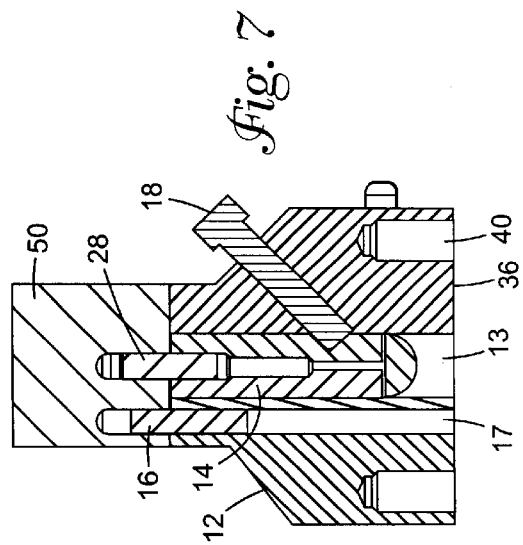
FIG. 7 shows a cross-sectional view of the invention taken along the lines 7—7 as shown in FIG. 6.

10 Chuck
12 Body
13 First Bore
14 Draw Bar
14*a* First End of Draw Bar
14*b* Second End of Draw Bar
15 Lock Bolt Bore
16 Pin
17 Bore
18 Lock Bolt
20 Cam
20*a* First End of Cam
20*b* Second End of Cam
21 Second Bore
22 Cam Lever
24 E-Clip
26 Threaded Bore
28 Electrode Mounting Screw
29 Threads on Electrode Mounting Screw
30 Notch
31 Round Side of Cam
32 Lever Aperture
34 Clip Channel
36 Chuck Mounting Surface
38 Electrode Mounting Surface
40 Mounting Aperture
50 Electrode
51 Underside of Electrode
52 Pin Bore
54 Threaded Bore Construction FIG. 1 shows a top perspective view of the chuck 10. The chuck 10 (FIG. 1) comprises a body 12 (FIG. 1) defining a first bore 13 (FIG. 2) and a second bore 21 (FIG. 6). In a preferred embodiment, the relative orientation of the first bore 13 to the second bore 21 is substantially perpendicular (i.e., at right angles to each other), however, other angular orientations between the first bore 13 and second bore 21 will also work. The first bore 13 extends through an electrode mounting surface 38 (FIG. 1) into the body 12 substantially perpendicularly to the plane (unnumbered) defined by the electrode mounting surface 38. In a preferred embodiment, the first bore 13 extends completely through the electrode mounting surface 38 of the body 12 to a chuck mounting surface 36 (FIG. 4). This is due to the body 12 preferably being made from stainless steel stock by means of wire EDM machining, which is very precise and has great repeatability. Other metals, however, will also work, including hardened steel and tool steel. The first bore 13, however, need not extend completely through the body 12, which could occur using other machining techniques such as drilling. In a preferred embodiment, the electrode mounting surface 38 and chuck mounting surface 36 each define planes (unnumbered), which are parallel with each other. A series of at least two, and preferably three pins 16 (FIG. 1) extend from the electrode mounting surface 38 surrounding and in parallel with the first bore 13. The pins 16 are fixedly attached to and extend from bores 17 (FIG. 4) provided in the electrode mounting surface 38 of the body 12. As best shown in FIGS. 7 and 8, in a preferred embodiment the bores 17 extend completely through the body 12 from the electrode mounting surface 38 to the chuck mounting surface 36. This is due to the preferred machining method of wire EDM, however, traditional methods such as drilling into the body 12 from the electrode mounting surface 38 would also work, which would not require the bores 17 to extend completely through the body 12. As best shown in FIG. 4, a plurality of threaded mounting apertures 40 (FIG. 4) extend through the chuck mounting surface 36 into the body 12 toward the plane (unnumbered) defined by the electrode mounting surface 38. In a preferred embodiment, the mounting apertures 40 terminate before extending completely through the body 12. A pallet (not shown) with a side (not shown) contacting the mounting surface 36 has apertures (not shown) corresponding with the positions of the mounting apertures 40 extending through the mounting surface 36. By means of bolts (not shown), the pallet (not shown) is attached to the chuck 10. The other side (not shown) of the pallet (not shown) has draw bar means (not shown) corresponding with a particular brand of EDM or CNC machine. The pallet (not shown) is thus pulled into a spindle (not shown) on an EDM or CNC machine by mechanical or hydraulic means. Thus, the pallet (not shown) serves as an intermediate member between the chuck 10 and EDM or CNC machine.

Figure 5:
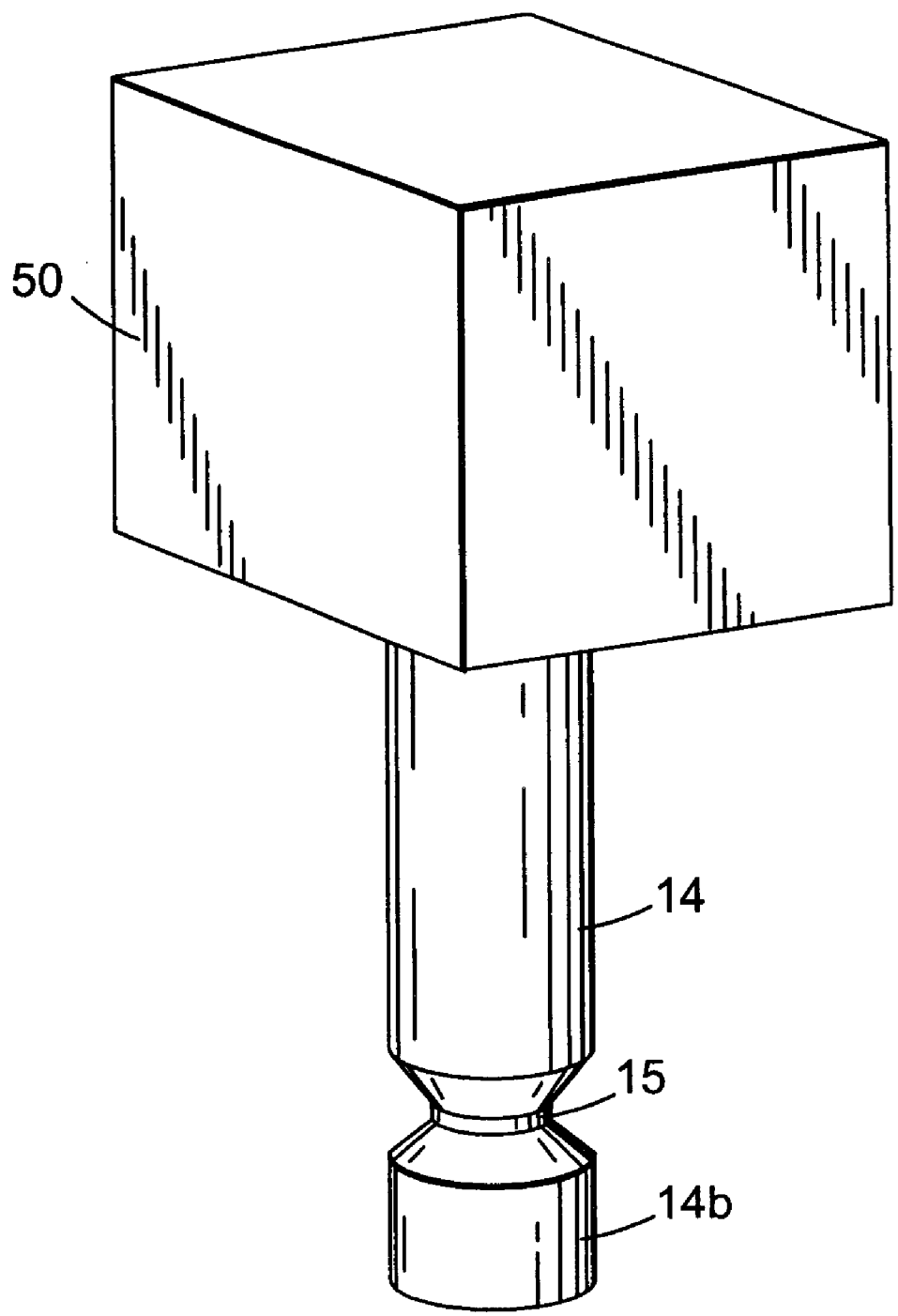
FIG. 5 shows a top perspective view of an electrode mounted to the draw bar.
Figure 9:
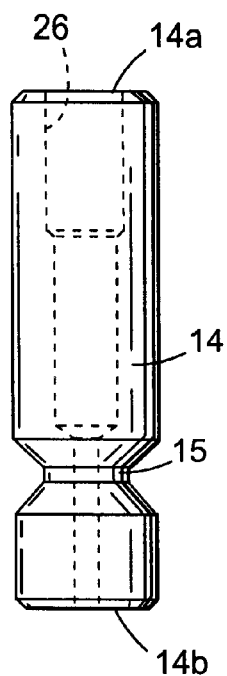
FIG. 9 shows a side view of the draw bar.

FIG. 2 shows the chuck 10 prior to insertion of a draw bar 14 (FIG. 5). The draw bar 14 is sized so as to be able to slidably fit within the first bore 13. In a preferred embodiment, the draw bar 14 defines a first end 14*a* (FIG. 9) and a second end 14*b* (FIG. 9), is generally cylindrical in nature and defines a lock bolt bore 15 (FIG. 5). The lock bolt bore 15 is used to secure the draw bar 14 in a lowered or machining position (unnumbered) which will be discussed in greater detail below. In a preferred embodiment, an electrode mounting screw 28 (FIG. 1) is attached to a threaded bore 26 (FIG. 9) and extends from the first end 14*a* of the draw bar 14. It is also contemplated by and therefore within the scope of the invention to have the draw bar 14 simply be machined from a single piece of tool steel having an integrally attached threaded member (not shown) extending from the first end 14a of the draw bar 14.

A cam 20 (FIG. 8) is in rotatable engagement with the second bore 21. As best shown in FIGS. 11–13, the cam 20 is generally cylindrical and defines a generally centrally located, flattened notch 30 (FIG. 11). The portion of the cam 20 that defines the notch 30 also defines a rounded side 31 (FIG. 11) which is simply the remainder of the cylindrical cam 20 following machining the notch 30. It should be noted that other types of cam mechanisms (not shown) could also be used including off center cam mechanisms. Proximate a first end 20a (FIG. 6) of the cam 20 a clip channel 34 (FIG. 12) concentric with the outer diameter (unnumbered) of the cam 20 is defined. The function of the clip channel 34 is to accept an E-clip 24 (FIG. 1) following insertion of the cam 20 into the second bore 21 to rotatably secure the cam 20 to the body 12. Proximate a second end 20b (FIG. 6) of the cam 20 is a lever aperture 32 (FIG. 12) the function of which is to receive a cam lever 22 (FIG. 1). Thus, when the draw bar 14 is inserted into the first bore 13 the second end 14b of the draw bar 14 should rest against the notch 30 or a segment of the round side 31 of the cam 20. When the cam lever 22 is manually grasped, the cam 20 can be rotated thereby causing the second end 14b of the draw bar 14 to follow the notch 30 or rounded side 31, resulting in raising or lowering the position of the draw bar 14 within the first bore 13.

Figure 1A:
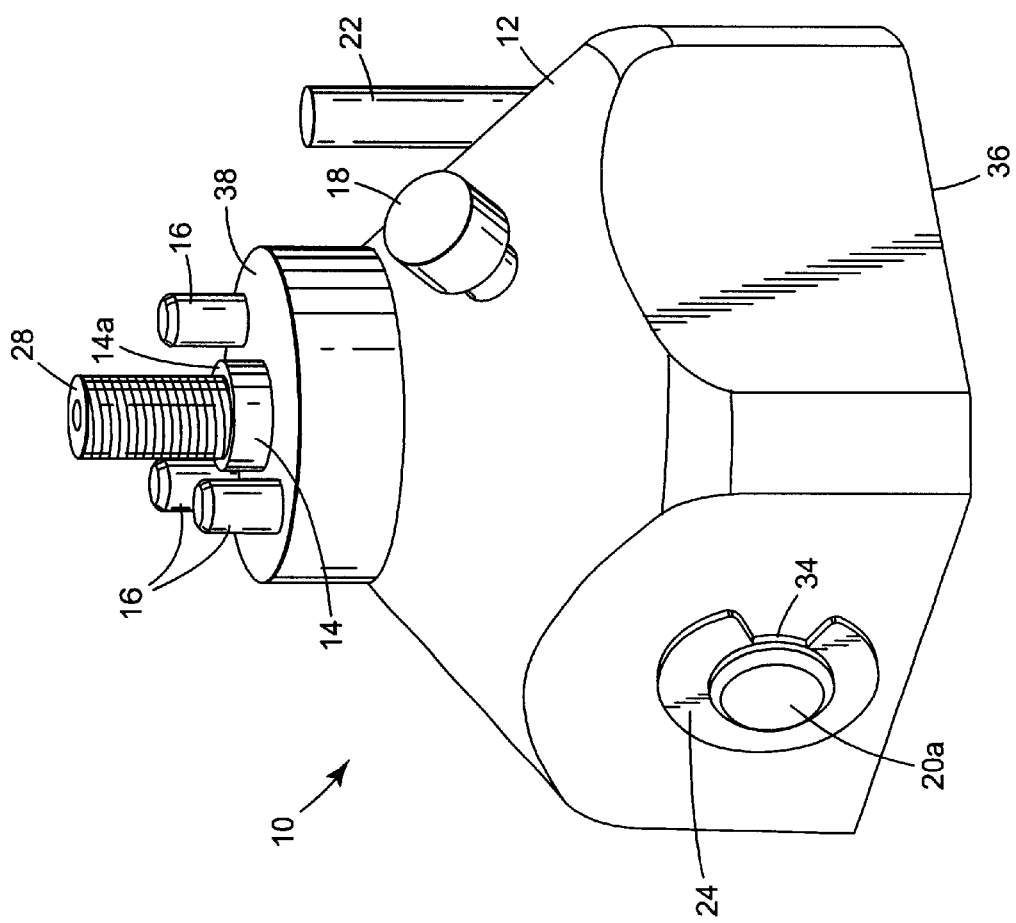
FIG. 1a shows a top perspective view of the invention, with the draw bar in the release position.

In the view shown in FIG. 1, the draw bar 14 is shown in the fully lowered or machining position, the significance of which will be discussed below. As shown in FIG. 1a, the draw bar 14 is shown in the fully extended or release position, the significance of which will also be discussed below.

As shown in FIGS. 14–16, prior to being machined into a shape resembling the finished molded product, an electrode 50 (FIG. 3a) has a generally geometric shape such as a cube (unnumbered). In a preferred embodiment, the electrode 50 is typically graphite, due to excellent performance as well as machinability. Other materials, however, are also sometimes us ed as electrodes 50, such as copper. The electrode 50 defines an underside 51 (FIG. 15) through which several pin bores 52 (FIG. 14) extend corresponding with the position and number of pins 16 mounted in the electrode mounting surface 38. A threaded bore 54 (FIG. 14) is also defined which is located so as to correspond with the position of the electrode mounting screw 28 and is provided with female threads (not shown) that match the male threads 29 (FIG. 1) on the surface of the electrode mounting screw 28.

Figure 3:
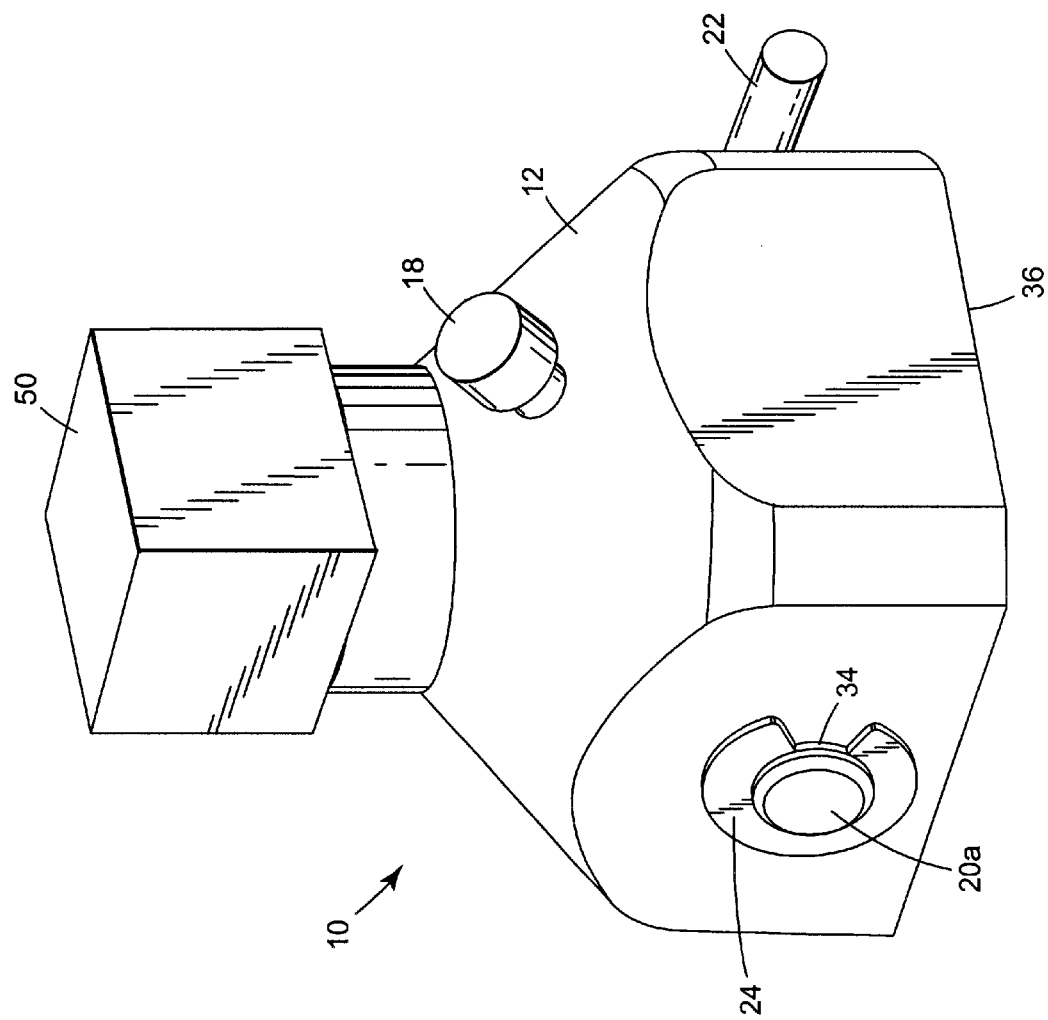
FIG. 3 shows a top perspective view of the invention with an electrode mounted to the chuck in the machining position.
Figure 3A:
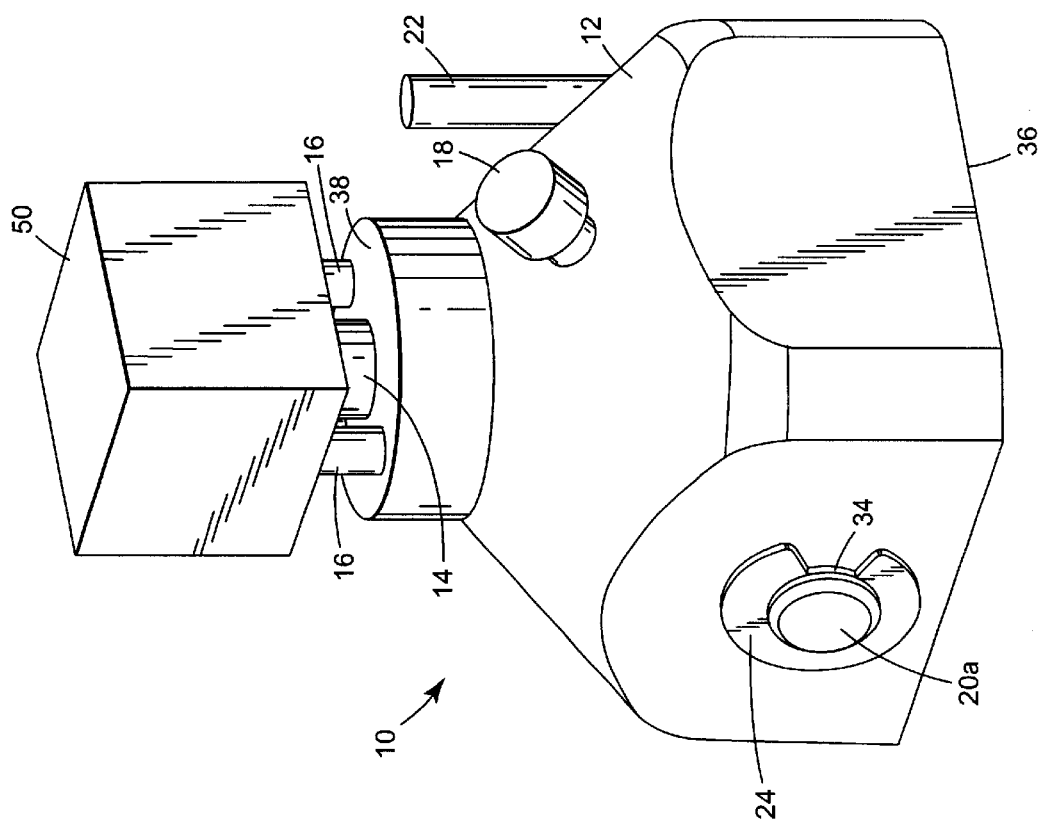
FIG. 3a shows a top perspective view of the invention with an electrode mounted to the chuck in the release position.
Figure 10:
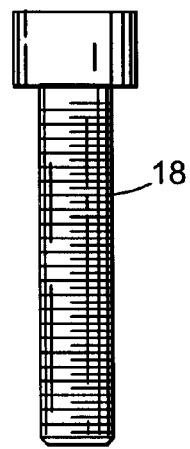
FIG. 10 shows a side view of the draw bar lock bolt.

Using the chuck 10 requires first attaching the draw bar 14 to the electrode 50. The draw bar 14 is grasped in one hand (not shown), while the electrode 50 is grasped in the other hand (not shown). Alternatively, the electrode 50 may be set down on a bench (not shown) with the underside 51 exposed. The first end 14a of the draw bar 14 with attached electrode mounting screw 28 is inserted in the threaded bore 54 and aligned. Following this, the draw bar 14 is rotated in a clockwise motion to allow the male threads 29 of the electrode mounting screw 28 to mate with the female threads (not shown) provided within the threaded bore 54. The draw bar 14 is thus rotated until the first end 14a contacts the underside 51 of the electrode 50, ensuring a firm mount. This results in the draw bar 14 being attached to the electrode 50 as best shown in FIG. 5. Next, the draw bar 14 (with attached electrode 50) is inserted into the first bore 13, making sure that the pin bores 52 are aligned with the pins 16 extending from the electrode mounting surface 38. It should be noted here that the cam 20 must be in the full down position (unnumbered) to allow the underside 51 of the electrode 50 to be able to contact the electrode mounting surface 38. As best shown in FIG. 3, at this point, the electrode 50 contacts and covers the electrode mounting surface 38. Next, the lock bolt 18 (FIG. 10) is rotated until it contacts the lock bolt bore 15 in the draw bar 14, ensuring that the electrode 50 is securely locked in the chuck 10.

Assuming that the chuck 10 has been previously mounted via a pallet appropriate to the particular brand of EDM or CNC machine used, the electrode 50 is now ready to be either used in EDM machining techniques or machined by CNC techniques prior to being used in EDM techniques.

When the EDM or CNC machining techniques are completed, the electrode 50 is removed from the chuck 10 by first loosening the lock bolt 18 by turning it counter-clockwise. When the lock bolt 18 no longer contacts or interferes with the draw bar 14, the cam lever 22 is rotated until the electrode 50 is separated from the electrode mounting surface 38. At this point, removal is a matter of the operator (not shown) manually grasping the electrode 50 and draw bar 14 to remove it from the chuck 10. The draw bar 14 is removed from the used or machined electrode 50, after which a new electrode 50 may be attached to the draw bar 14 if desired, and the process repeated.

What is claimed is:

1. A chuck, comprising:
   (a) a body having a mounting surface and defining a longitudinal bore extending into the body through the mounting surface;
   (b) a draw bar configured and arranged for longitudinal slidable engagement within the bore as between a machining position and a release position;
   (c) a release mechanism in physical communication with the bore whereby activating the release mechanism is effective for moving the draw bar from the machining position to the release position; and
   (d) at least three longitudinally extending parallel pins extending outward from the mounting surface and forming an asymmetric pattern about the longitudinal bore.

2. The chuck of claim 1 wherein the draw bar is removable from the bore substantially resistance free when the draw bar is in the release position.

3. The chuck of claim 1 further comprising a lock bolt effective for releasably locking the draw bar in the machining position.

4. The chuck of claim 1 wherein a first longitudinal end of the draw bar is threaded.

5. The chuck of claim 1 wherein the chuck has a bottom surface and the chuck further comprises a plurality of longitudinally extending threaded bores extending into the chuck from the bottom surface.

6. A chuck, comprising:
   (a) a body having a mounting surface and defining a longitudinally extending bore through the mounting surface;
   (b) a draw bar configured and arranged for longitudinal slidable engagement within the bore as between a machining position and a release position;
   (c) a release mechanism coupled to the body and in communication with the bore for movement between a first position and a second position wherein the release mechanism is effective for longitudinally lifting the draw bar from the machining position to the release position when the release mechanism is moved from the first position to the second position, and;

(d) at least three longitudinally extending parallel pins extending outward from the mounting surface.

7. The chuck of claim 6 wherein the draw bar is removable from the bore substantially resistance free when the draw bar is in the release position.

8. The chuck of claim 6 further comprising a lock bolt effective for releasably locking the draw bar in the machining position.

9. The chuck of claim 6 wherein a first longitudinal end of the draw bar is threaded.

10. The chuck of claim 6 wherein the release mechanism comprises at least (i) a cam positioned within the longitudinal bore, and (ii) a hand operable mechanism in communication with the cam effective for rotating the cam from the first position to the second position upon hand actuation of the mechanism.

11. The chuck of claim 6 wherein the chuck has a bottom surface and the chuck further comprises a plurality of longitudinally extending threaded bores extending into the chuck from the bottom surface.

12. A combination comprising:
(a) the chuck of claim 1; and
(b) a graphite electrode releasably mounted to a first longitudinal end of the draw bar and having positioning bores configured and arranged to align with each of the pins when the draw bar is engaged within the bore.

13. A combination comprising:
(a) the chuck of claim 2; and
(b) a graphite electrode releasably mounted to a first longitudinal end of the draw bar and having positioning bores configured and arranged to align with each of the pins when the draw bar is engaged within the bore.

14. A combination comprising:
(a) the chuck of claim 3; and
(b) a graphite electrode releasably mounted to a first longitudinal end of the draw bar and having positioning bores configured and arranged to align with each of the pins when the draw bar is engaged within the bore.

15. A combination comprising:
(a) the chuck of claim 4; and
(b) a graphite electrode threadably mounted to the first longitudinal end of the draw bar and having positioning bores configured and arranged to align with each of the pins when the draw bar is engaged within the bore.

16. A combination comprising:
(a) the chuck of claim 6; and
(b) a graphite electrode releasably mounted to a first longitudinal end of the draw bar and having positioning bores configured and arranged to align with each of the pins when the draw bar is engaged within the bore.

17. A combination comprising:
(a) the chuck of claim 7; and
(b) a graphite electrode releasably mounted to a first longitudinal end of the draw bar and having positioning bores configured and arranged to align with each of the pins when the draw bar is engaged within the bore.

18. A combination comprising:
(a) the chuck of claim 8; and
(b) a graphite electrode releasably mounted to a first longitudinal end of the draw bar and having positioning bores configured and arranged to align with each of the pins when the draw bar is engaged within the bore.

19. A combination comprising:
(a) the chuck of claim 9; and
(b) a graphite electrode threadably mounted to the first longitudinal end of the draw bar and having positioning bores configured and arranged to align with each of the pins when the draw bar is engaged within the bore.

* * * * *